Aug. 8, 1950     J. LIENHART     2,517,690
CONTINUOUS PROCESS FOR DECARBOXYLATING ROSIN
Filed June 27, 1946     2 Sheets-Sheet 1

Jean Lienhart

Patented Aug. 8, 1950

2,517,690

UNITED STATES PATENT OFFICE 2,517,690

CONTINUOUS PROCESS FOR DECARBOXYLATING ROSIN

Jean Lienhart, Paris, France, assignor to Compagnie Francaise de Raffinage, Societe Anonyme, Paris, France Application June 27, 1946, Serial No. 679,724
In France May 8, 1943

Section 1, Public Law 690, August 8, 1946
Patent expires May 8, 1963

4 Claims. (Cl. 260—106)

The present invention has for its object a process and an apparatus for continuous catalysts in the liquid phase. The application thereof was made in the first place to the catalytic decarboxylation of colophony (rosin) and it is in respect of this application that the invention will be described hereinafter although, as will be shown subsequently, the invention is applicable to many other catalytic reactions.

The catalytic decarboxylation of colophony has hitherto been carried out in boilers or stills of which the capacity may be as much as several tons. Such boilers, which are provided or not with stirrers, contain the mass of rosin to be decarboxylated and, optionally, the catalyst. Various catalysts have been proposed; mention may, for instance, be made of phosphoric acid in proportions which may vary, according to the authority, from 1 to 50%.

I have discovered that it was advantageous to feed the melted colophony into an inert liquid mass which is in a state of violent agitation and which contains the catalyst in solution or in suspension. Said inert mass is in fact, but not necessarily, formed by the decarboxylated oil itself, a part of which circulates in a closed circuit, whereas a quantity of decarboxylated oil corresponding to the colophony supplied is continuously extracted from the circuit.

The catalyst, which gradually becomes coated with acid tars and thereby loses a part of its activity, is likewise continuously extracted from the circuit and then regenerated by any appropriate means and continuously or periodically reintroduced into the circuit. It will thus be kept in a good average state of activity. For this purpose, after having separated the gases formed and the pinoline, decantation is carried out continuously in order to separate the oil from the acid tars formed, and both said tars and said oil are continuously extracted.

Figure 1:
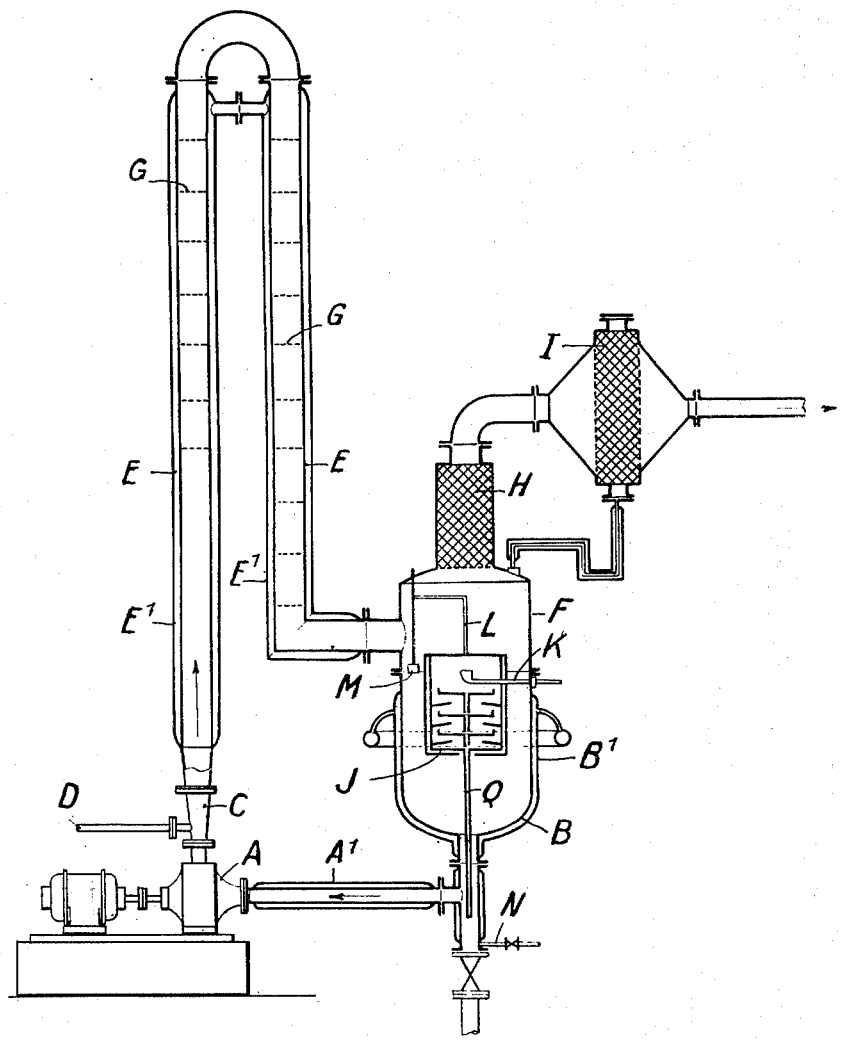
Figure 2:
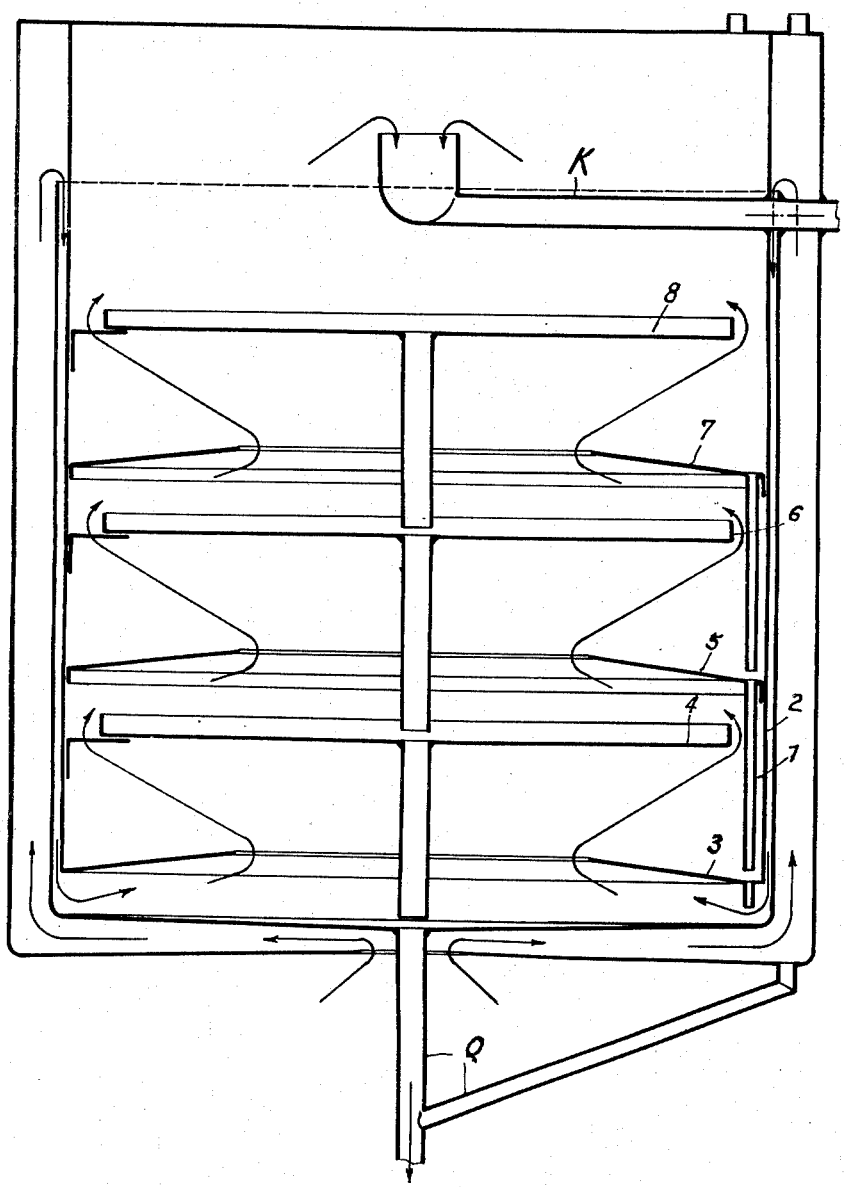

The accompanying drawing shows in:

Fig. 1 an apparatus for continuous catalysis according to the invention;

Fig. 2 an axial section of a decanter which, per se, is an object of the invention.

Referring to Fig. 1:

The rosin, which has been melted and raised to a temperature which may be as high as 250° C., is conveyed to the apparatus through a tube D and is injected, at the rate of about 1200 kg. per hour by means of a volumetric pump A, into the suction circuit of an injector C, the driving fluid of which mainly comprises decarboxylated oil containing the catalyst which is pumped in a closed circuit. The catalyst may, for example, be phosphoric acid contained in a proportion of about 2% in the decarboxylated oil.

The pump A sucks in, through the pipe $A^1$, at the rate of about 100 cu. meters per hour, the catalytic mixture from the bottom of the tank B and delivers it into the injector C. The melted rosin from D is diffused in the catalytic mixture which is then pumped into a vertical column E which returns the liquid to the dome F of the separating tank B. Baffles G arranged inside the column keep the liquids stirred. Use may advantageously be made, for instance, of foraminous discs enabling agitation to be maintained, or any like system, in particular a packed column.

The temperature of decarboxylation which, with the catalyst chosen, is of the order of 250° C., is obtained for example by means of an oil circulation jacket $E^1$ in the case in which E is a simple vertical column.

In the dome F the separation of the gases and the oil takes place. Said gases, which are composed on the one hand of $CO_2$, CO and of some hydrocarbons produced by the decarboxylation, and on the other hand of water vapor and pinoline, flow into a vertical dephlegmator H, then into a separator I, both with Raschig filling. The carrying over of oil or rosin is thus prevented.

The gases then flow into a condenser and into a pinoline and acid water separator, not shown.

The tank B is provided with an oil circulation jacket $B^1$, by means of which a temperature of 250° C. is maintained.

Instead of using an injector such as C, it is possible of course, without departing from the invention, to introduce the rosin before the suction of the pump A, the stirring being in that case effected inside the pump itself. But the injector is certainly preferable, owing to the fact that it produces the most intimate contact with a comparatively small expenditure of power.

The continuous decanter J, the volume of which is about 400 liters makes it possible to extract at K a decarboxylated oil which is practically free from catalyst. Said decanter is located inside the tank B where the reaction is completed and where the gases and the vapors are separated.

Thus located, said decanter offers the dual advantage, on the one hand of decreasing the relative volume of the tank B, thereby facilitating the heat exchange, and on the other hand of effecting decantation in the hot state and at constant temperature.

The tube shown at L acts as a pressure balancer.

At M has been shown a float which may, for example, serve for regulating the extraction.

The extraction of the tars and of the catalyst to be regenerated is effected in a dead end N. Said dead end obviates delicate adjustments, since it enables more or less tar to be extracted without such extraction's being rigidly proportional to the output of the decanter.

Although any type of decanter is suitable for the application of the process according to the invention in this apparatus, I have designed a novel type of decanter which is shown in Fig. 2 and which is characterised in that it provides the possibility of decanting in a plurality of thin layers, for example in three layers as in the figure. This result is obtained by means of a set of screens: the screens 1 and 2, which are cylindrical, form a passage during the flow through which it is possible, in every case, for the reactions to be completed; the horizontal screens 4, 6, 8 limit three decanting chambers; the conical screens 3, 5, 7 guide the liquid. Further details of the decanter and its operation are disclosed in my copending application, Serial No. 45,157, filed August 19, 1948.

The tars are collected by outflow tubes Q, both at the central part and at the peripheral part. The oil is extracted at the upper part through an extraction pipe K.

The extraction of the tars at N (Fig. 1) does not exceed about 25 liters, which represents a tiny loss of catalyst, even without regeneration. The regenerated catalyst is re-introduced at any point of the circuit.

The oil obtained is of a fine color and requires less earth for refining or isomerizing than the oils obtained by the other decarboxylating processes.

The process has been described with reference to the decarboxylation of rosin, but it is obviously applicable to other continuous catalyses in the liquid phase. In a general manner, the invention is applicable each time that the finished product is separable from the circulating mass by decantation, and/or that the worn out catalyst is also separable from the mass by decantation.

The spirit of the invention is not altered by replacing the decantation by centrifugation.

It can be seen that the invention is applicable, inter alia, to reactions with catalysts of the Friedel and Crafts type, producing the most oily products.

The plant is suitable for various manners of carrying out the process, which are all included in the invention:

Whether the whole of the complex is extracted at N, and subsequently hydrolysed to obtain the oil; this, for instance, is the case of the condensation of the aromatics and of the dihalogen alkyls by means of aluminum chloride;

Whether a prime oil is extracted at K, and at N the complex which yields a second quality oil; this, inter alia, is the case of the treatment of shale-oil with aluminum chloride;

Whether the oily product is extracted at K, leaving the major part of the complex in the circuit, if said complex has catalysing qualities, in which case only the tarry portion is extracted from the circuit at N, as in the case of the decarboxylation dealt with above. This will be, for instance, the case of the polymerisation and of the alkylation of olefines or of the treatment of the mean fractions of raw petroleum or of refining gasoline with aluminum chloride.

I claim:

1. A continuous process for the liquid phase decarboxylation of rosin in the presence of a catalyst for the purpose of preparing a rosin oil comprising the steps of continuously circulating a reaction mass comprising said rosin and catalyst in a closed path, heating and agitating said mass as it travels along said path to cause said rosin to be decarboxylated, continuously introducing into said reaction mass at a feed point in said path a mixture of catalyst and molten rosin to be decarboxylated, violently agitating said mixture as it is introduced into the reaction mass at said feed point, and continuously withdrawing decarboxylated rosin from said closed path at a point substantially spaced from said feed point.

2. A continuous process for the liquid phase decarboxylation of rosin in the presence of a catalyst for the purpose of preparing a rosin oil comprising the steps of continuously circulating a reaction mass comprising said rosin and catalyst in a closed path, heating and agitating said mass as it travels along said path to cause said rosin to be decarboxylated, continuously introducing into said reaction mass at a feed point in said path a mixture of catalyst and molten rosin to be decarboxylated, violently agitating said mixture as it is introduced into the reaction mass at said feed point, separating said decarboxylated rosin from said catalyst by continuous decantation in a separating zone within said closed path substantially spaced from said feed point, and continuously withdrawing decarboxylated rosin from said separating zone.

3. A continuous process for the liquid phase decarboxylation of rosin in the presence of a catalyst for the purpose of preparing a rosin oil comprising the steps of continuously circulating a reaction mass comprising said rosin and catalyst in a closed path, heating and agitating said mass as it travels along said path to cause said rosin to be decarboxylated, continuously introducing into said reaction mass at a feed point in said path a mixture of catalyst and molten rosin to be decarboxylated, violently agitating said mixture as it is introduced into the reaction mass at said feed point, separating spent catalyst from said reaction mass in a separating zone of said closed path spaced from said feed point, withdrawing spent catalyst from said separating zone, and continuously withdrawing decarboxylated rosin from said closed path at a point spaced from said feed point and also from the point of withdrawal of said spent catalyst.

4. A continuous process for the liquid phase decarboxylation of rosin in the presence of a catalyst for the purpose of preparing a rosin oil comprising the steps of continuously circulating a reaction mass comprising said rosin and catalyst in a closed path, heating and agitating said mass as it travels along said path to cause said rosin to be decarboxylated, continuously introducing into said reaction mass at a feed point in said path a mixture of catalyst and molten rosin to be decarboxylated, violently agitating said mixture as it is introduced into the reaction mass at said feed point, separating gaseous reaction products from said reaction mass in a first separating zone of said closed path and removing separated gaseous products from said first zone, separating decarboxylated rosin from the catalyst by continuous decantation in a second separating zone within said closed path and withdrawing said decarboxylated rosin from said second separating zone, and separating spent catalyst in a third separating zone of said closed path and withdrawing said spent catalyst from said third separating zone, all of said three separating zones in said closed path being substantially spaced from said feed point and from each other.

JEAN LIENHART.

REFERENCES CITED

The following references are of record in the file of this patent:

UNITED STATES PATENTS

| Number | Name | Date |
|---|---|---|
| 1,131,939 | Melamid | Mar. 16, 1915 |
| 1,660,762 | Palmer | Feb. 28, 1928 |
| 2,228,960 | Lelgemann | Jan. 14, 1941 |
| 2,332,527 | Pyzel | Oct. 26, 1943 |
| 2,246,703 | Thiele | June 24, 1941 |
| 2,374,511 | Upham | Apr. 24, 1945 |
| 2,375,590 | Schonberg et al. | May 8, 1945 |